June 13, 1967 C. I. McVEY ET AL 3,324,543

PRESSURE BONDED CERAMIC-TO-METAL GRADIENT SEALS

Filed March 26, 1965

INVENTORS.
Charles I. McVey
BY Newton McConnaughey
Roland A. Anderson
ATTORNEY.

United States Patent Office 3,324,543

Patented June 13, 1967

3,324,543

PRESSURE BONDED CERAMIC-TO-METAL GRADIENT SEALS

Charles I. McVey, Cincinnati, and Newton McConnaughey, Lynchburg, Ohio, assignors to the United States of America as represented by the United States Atomic Energy Commission Filed Mar. 26, 1965, Ser. No. 443,116
3 Claims. (Cl. 29—472.9)

ABSTRACT OF THE DISCLOSURE

The method comprising encapsulating the faying surface of a ceramic and metal in a hermetic seal prior to pressure sintering of said surface in order to remove dissolved and occluded gases before producing a sintered ceramic-metal bond.

Figure 2:
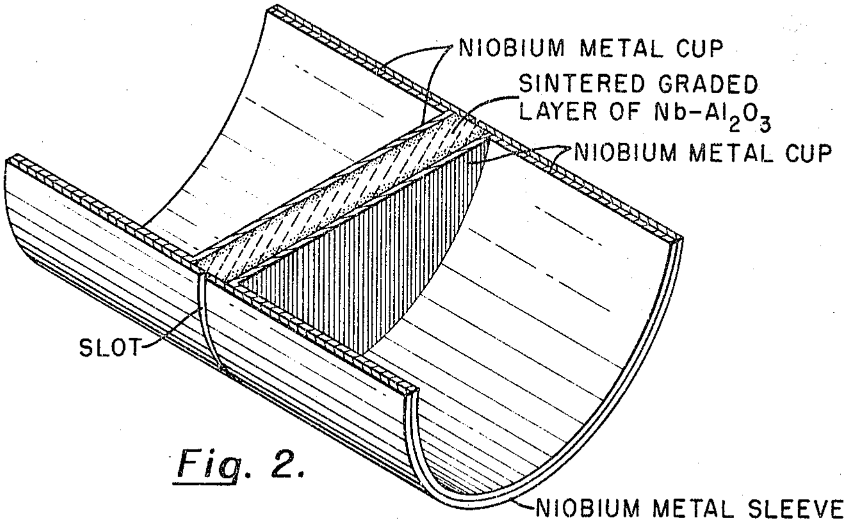

This invention relates to ceramic-to-metal seals. More particularly, it relates to, and has for its principal object to provide a pressure bonded seal which is formed at a temperature at least equal to the design temperature service conditions of said seal, and in which the faying surfaces of the ceramic and metal members are bonded to an intermediate composition gradient zone of said ceramic and metal. Other objects will be apparent from the ensuing description.

The bonding of ceramics-to-metals is a common procedure in the electrical and electronics industry. The basic problem is to construct a ceramic-to-metal seal which can function satisfactorily over long periods of time at high temperatures and through wide temperature cycles in vacuum, inert gas, or even in such corrosive media as alkali metal vapors. Many electrical and electronic devices require encapsulation to prevent loss, contamination or dilution of an enclosed operating environment. These devices often require electric leads through their containing walls. Electric lights and electronic tubes are common devices of this type. Many similar devices operate most efficiently at high (i.e., in excess of 1000° C.) temperatures. Some examples where a high temperature resistant ceramic-to-metal, metal-to-metal, or ceramic-to-ceramic bond is required include receiving and transmitting tubes made of metal and/or ceramic; alkali metal vapor lamps; thermionic energy converters; ion propulsion devices; particle accelerators; electrical energy storing devices; and high thermal conductance electrical insulators such as are required in thermoelectric devices.

Heretofore, ceramic-to-metal seals for any of the aforementioned or similar purposes have generally been made by metallizing the surface of the ceramic and then brazing the metal to the metallized surface. Successful bonding in such a process is very closely determined by the materials used in the metallizing and brazing operation. For example, the metallizing material must be strongly bonded to the faying ceramic surface and must, in addition, include material which will assist in the subsequent brazing operation. The choice of metallizing material and braze material must take into careful account the varying coefficients of expansion of the ceramic and metal members, as well as the expansion coefficients existing between the metallizing composition and the brazing composition. Another difficulty arises in utilizing a metallizing-braze procedure when a refractory metal selected from the class tungsten, rhenium, molybenum, zirconium, noibium, hafnium, tantalum and any other metal or alloy which melts above about 1500° C., is to be joined to a ceramic member. The problem here is in the selection of a suitable high melting brazing material. In general, the melting point and other physical properties required of a brazing alloy are restricted to materials which melt far below the service temperature capabilities of the materials to be joined. These refractory metals or alloys thereof can operate at a temperature environment in excess of 1500° C. provided a suitably strong bond could be made to the ceramic; but the potential service conditions are frequently severely limited by the dearth of suitable high temperature metallizing and brazing materials. Thus, for example, a beryllia-niobium joint or seal capable of operating successfully at temperatures in excess of 1600° C. is limited to a much lower temperature because of the relatively low melting point of available braze and metallizing material. In addition, such bonds of the prior art are often reactive with alkali metal vapor particularly when compounds of silicon are present. Many of the afore-mentioned limitations characteristic of the metallizing-brazing approach are either eliminated or ameliorated by the practice of the present invention.

The present inventive concept, as applied to one specific but broad area of application, involves the solid state bonding between a refractory metal of the defined class and an electrically insulating ceramic material in which the sealing region between said metal and said ceramic comprises a mixed conglomerate of said metal or alloy and the ceramic in varying proportions of each between the metal and ceramic. After processing a hermetic graded region of high strength and service capabilities is formed between the metal and ceramic members.

Figure 1:
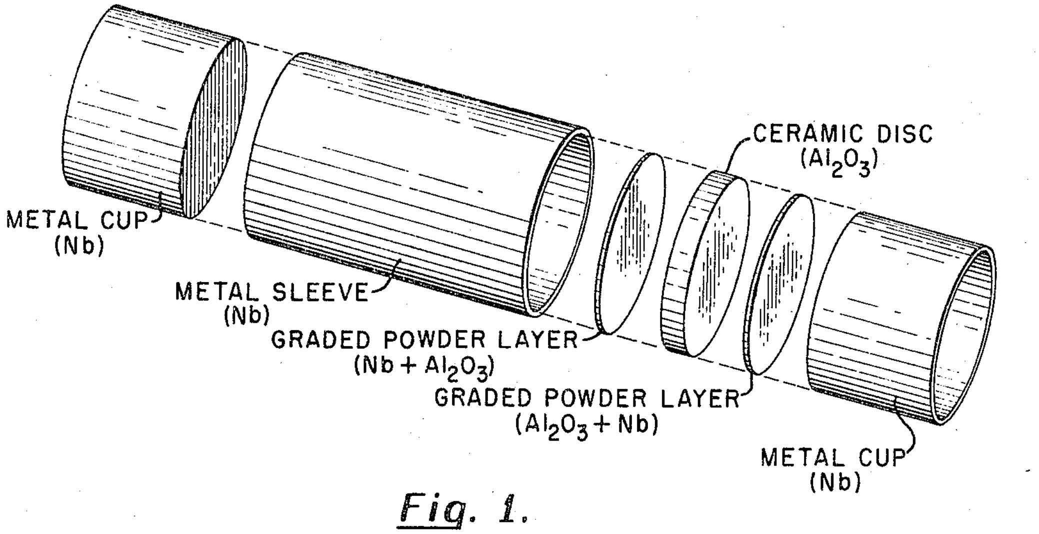

The features of the invention, both as to its organization and method of fabrication, will be understood from the ensuing description taken in connection with the accompanying figures, in which FIG. 1 shows an exploded view (not to scale) of the component parts of a typical ceramic-to-metal seal which can be made in accordance with this invention, and FIG. 2 is a perspective cutaway view (somewhat closer to scale) of seal and joined assembly of the component parts of FIG. 1. In the exemplary embodiment shown in the figures, the object in point is to form a sandwich seal between cylindrical shapes of metal and a centrally located ceramic dics. For purposes of illustration, consider the metal to be made of 10–20 mils thick niobium sheet and the ceramic disc to be of 100–125 mils thick Lucalox alumina, an exceptionally fine grade of alumina made by the General Electric Company or a Linde A grade of alumina. The starting elements include two hollow metal niobium caps which fit inside a niobium sleeve to encompass the cylindrical ceramic disc and the intermediate material zone between the ceramic and metal members. The intermediate material zone comprises a powder mixture or powder composite of the metal and ceramic—in this case niobium and alumina. The composition of the intermediate layer or layers is graded according to its proximity to the faying metal or ceramic surface. For example, the increment of the intermediate layer closest to the faying metal surface should generally comprise a major proportion of metal and a minor proportion of ceramic. This may vary from as little as 50 to in excess of 99 percent, by weight, metal and the remainder ceramic. Similarly, the intermediate layer in the proximity of the ceramic disc may vary in the same manner with the major proportion consisting of ceramic and the minor proportion consisting of metal. The exact proportions and absolute amounts of the intermediate layer will be determined by such factors as the difference in coefficients of thermal expansion between the metal and ceramic, and the extent of electrical resistance required or desired across the seal.

Special precautions are followed during the processing to insure cleanliness of the materials. In the example of a niobium-to-alumina bond after conventional cleaning techniques, i.e., degreasing, are used, the niobium is chemically polished with a solution consisting of nitric, sulfuric, and hydrofluoric acids. The alumina is treated with a similar solution to remove surface defects and contaminants.

The intermediate layer or layers can be applied by simply dusting layers of the powder onto the faying ceramic or metal surfaces, or as shown in the figure, by forming thin wafers of the composition gradient mixture by pressing them to desired geometry and to a green strength sufficient to allow handling. Another possible way of applying the powder is by simply spraying it onto either faying surface with the one or several compositions necessary to achieve the desired composition gradient.

The next step is to assemble the components of the seal into an evacuated assembly. Thus, in the components shown in the accompanying figure, the ceramic disc is inserted midway into the sleeve. In place of the ceramic disc one may simply apply a layer of pure ceramic on one side of the graded discs. The composition graded discs are inserted on either side of the ceramic seal followed by the metal cups. After assembly, the bottoms of the metal cups are pressed together to loosely compact the seal components. The metal cups are then electron beam welded in vacuum about their rims to the end of the metal sleeve to form an evacuated gas-tight assembly. The ceramic-to-metal seal assembly is then consolidated by subjecting it to high pressure and temperature such as in a gas pressure furnace to effect pressure sintering and bonding of the component parts of the seal assembly. In the particular example under discussion, the intermediate layer of metal and ceramic consisted of mixed powders of high purity niobium metal (−325 mesh) and Linde A alumina (0.3 micron) together with ½ weight percent magnesium oxide based on the weight of the Linde A alumina powder. The slight magnesium oxide addition was used to promote sintering and control adverse grain growth in the intermediate zone. The furnace was purged of air. Helium was then injected to a pressure of 10,000 p.s.i.g. while the temperature was being raised to 1650° C. at approximately 15° C. per hour. Temperature and pressure were held for approximately 60 minutes, whereupon the pressure was gradually reduced to 50 p.s.i.g. The temperature was then reduced at a rate of approximately 15° C. per hour until ambient temperature was reached. The pressure was then reduced to ambient. After this treatment, it was found that the intermediate zone was securely bonded to both the ceramic and metal member and had sintered to virtually theoretical density. The sintered graded layer is shown in FIG. 2 in relation to the component parts of the joined assembly. In actual use a slot is cut out of the sleeve in the seal zone to the depth of the sleeve in order to develop an electrically insulated zone across the seal. The mechanical integrity of the consolidated ceramic-to-metal seal was then tested by heat treatment in an argon atmosphere for about 500 hours at 1600° C. during which it had experienced two temperature excursions of over 50° C. per minute during heating and cooling. Microstructure studies of the sintered intermediate zone showed virtually no changes due to the time at temperature or to the temperature excursions.

The strength of a typical graded bond of niobium-to-Lucalox was tested in tension and determined to be in excess of 20,000 p.s.i. By comparison, a direct metal-to-ceramic joint made in accordance with the same processing schedule as hereinbefore described but without inclusion of the graded ceramic-metal layers failed in tension at approximately 8,000 p.s.i.

Electron microprobe analysis revealed a diffusion zone of approximately 10 microns in width between the microscopic niobium and alumina interfaces indicating the probability of a bond of solid solution or chemical nature.

In a similar manner, high strength, pressure bonded seals can be made between such metals as tungsten, molybdenum, zirconium, hafnium, tantalum, rhenium, ruthenium, palladium, platinum, titanium, vanadium, chromium and other metals or alloys thereof which melt in excess of 1500° C. and ceramics such as BeO, MgO, $TiO_2$, $ZrO_2$, $Y_2O_3$, $HfO_2$ and rare earth oxides such as ceria, lutetium oxide, $ThO_2$,$UO_2$; intermetallics, borides, carbides, nitrides, silicides of the afore-mentioned metals and physical (e.g. solid solution), or chemical combinations thereof, with the intermediate composition comprising a powder conglomerate of the selected metal and selected ceramc, graded in composition according to its proximity to either faying surface.

While this invention has been demonstrated in the exemplary embodiment as useful in forming a ceramic-to-metal seal, it will be equally clear that the method and its advantages may be realized in forming ceramic-to-ceramic and metal-to-metal bonds.

The process as described has been stated to be particularly applicable for making seals with a refractory metal, that is, a metal which for the purposes of this invention, is one which melts above 1500° C. Although notably successful with such refractory metals, the method is also useful in joining any other metal normally used in forming a ceramic-to-metal seal, but some of the advantages of the pressure bonded gradient seal technique might not be so apparent in comparison to the metallizing-braze processes where materials are more readily available for sealing the lower melting metals, depending upon design service requirements.

It should also be realized that while this method has been described with reference to a gas pressure bonding system, other hot pressing techniques for sintering and consolidating the seal components may also be used to realize the objects of this invention. Thus, hot pressing the encapsulated seal assembly in a standard punch and die unit will be effective if the requisite temperature is reached and the requisite time at pressure and temperature is maintained for maximum densification and consolidation.

It should also be noted that the components of the seal assembly need not be encapsulated prior to consolidation if a high vacuum hot press unit were used. The purpose of encapsulation is to exclude air or other gases which may be soluble in or occluded to the mixed powder conglomerate proximate to and on the faying surfaces. When gas of this character is present in appreciable amounts, it may interfere with the mechanical integrity of the seal by causing high pressure bubbles to form during the hot pressing operation. This is particularly true when inert gases are present such as helium or argon. Therefore, hermetic encapsulation of the seal components prior to consolidation should be regarded as a preferred technique in order to obtain a seal of maximum mechanical integrity.

Nor is the geometry of a seal to be regarded as a limitation to this invention. For example, tubular seals graded longitudinally or radially as well as seals permitting the entrance of a rod ribbon or wire into a system or device are equally applicable.

It will thus be seen that a seal forming technique is described which has a wide and flexible range of applicability and provides a much wider latitude of choice in materials to be used in the seal forming zone. A notable feature of this process is the "composition gradient layering" technique where a number of layers with varying metal-to-ceramic proportions is provided between the faying surfaces in order to distribute any differential in thermal expansion between the metal and ceramic which otherwise would result in fracture during thermal cycling. Another significant and distinguishing feature over the standard metallizing and braze technique is that the seal formed in accordance with this invention takes place during a solid state sintering operation at temperatures at least equal to the intended temperature service conditions designed for the seal and for the device in which it is to be incorporated. Therefore, development and design of thermionic converters and similar devices which will operate reliably at temperatures in excess of 1000° C. will be considerably ameliorated. The problem of forming high temperature seals heretofore has been side-stepped by design compromises such as by operating below optimum design temperatures. A further unique feature of this invention is that the materials used in the seal are relatively independent of the seal forming process and are based almost solely on the design operating conditions for the seal. This is to be compared and contrasted with the metallizing-braze technique wherein the materials must be chosen and limited to those which wet and flow on the ceramic surfaces and to those braze materials which wet and flow on the metallized surface.

Having thus described our invention, we claim:

1. A method of bonding a metal to a ceramic which comprises:

(a) disposing multilayers of a powder mixture of said metal and said ceramic between the faying surfaces in which the proportion of ceramic and metal of each layer varies according to its proximity to said faying surfaces;

(b) encasing the periphery of said surfaces with hermetic container means;

(c) evacuating the encased surfaces to form a hermetic seeal; and (d) subjecting the resulting hermetic assembly to a combination of sufficient pressure and temperature to sinter and bond said mixture to said faying surfaces.

2. The method according to claim 1 wherein the metal is selected from one which melts above 1500° C. and the ceramic is selected from a boride, carbide, nitride, oxide or silicide.

3. The method according to claim 1 wherein the metal is selected from tungsten, molybdenum, zirconium, hafnium, niobium, tantalum, rhenium, ruthenium, palladium, platinum, titanium, vanadium, chromium and alloys thereof.

References Cited

UNITED STATES PATENTS

| | | | |
|---|---|---|---|
| 2,399,773 | 5/1946 | Waintrob | 75—208 |
| 2,696,652 | 12/1954 | Cronin | 75—208 X |
| 2,992,959 | 7/1961 | Schrewelius | 75—206 X |
| 3,047,938 | 8/1962 | Dega | 75—208 X |
| 3,148,981 | 9/1964 | Ryshkewitch | 75—206 |

JOHN F. CAMPBELL, *Primary Examiner.*

L. J. WESTFALL, *Assistant Examiner.*